(12) United States Patent
Chavez et al.

(10) Patent No.: US 11,929,798 B2
(45) Date of Patent: Mar. 12, 2024

(54) TECHNIQUE FOR POST-CORRELATION BEAMFORMING

(71) Applicant: Rockwell Collins, Inc., Cedar Rapids, IA (US)

(72) Inventors: Carlos J. Chavez, Marion, IA (US); Sasha Oster, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/461,568

(22) Filed: Aug. 30, 2021

(65) Prior Publication Data

US 2023/0069488 A1 Mar. 2, 2023

(51) Int. Cl.
*H04B 7/0426* (2017.01)
*H04B 7/0408* (2017.01)
*H04B 7/08* (2006.01)

(52) U.S. Cl.
CPC .......... *H04B 7/043* (2013.01); *H04B 7/0408* (2013.01); *H04B 7/0854* (2013.01)

(58) Field of Classification Search
CPC ..... H04B 7/043; H04B 7/0408; H04B 7/0854
See application file for complete search history.

(56) References Cited

U.S. PATENT DOCUMENTS

| | | | | |
|---|---|---|---|---|
| 6,075,484 A * | 6/2000 | Daniel | ....................... | G01S 3/74 342/372 |
| 6,237,242 B1 * | 5/2001 | Woytassek | ............. | G02B 7/004 33/645 |
| 6,396,953 B1 * | 5/2002 | Abbey | .................... | G06F 18/00 375/150 |
| 6,421,000 B1 * | 7/2002 | McDowell | .............. | G01S 19/36 342/425 |
| 6,438,187 B1 * | 8/2002 | Abbey | .................... | H04L 7/042 370/514 |
| 6,487,526 B1 * | 11/2002 | Mitchell | ................. | G10L 19/00 704/201 |

(Continued)

FOREIGN PATENT DOCUMENTS

| CN | 1489832 A | * | 4/2004 | ........... H04B 1/7113 |
|---|---|---|---|---|
| CN | 104880714 B | * | 3/2017 | |

(Continued)

OTHER PUBLICATIONS

"A GNSS software receiver beamforming architecture", by M. Li, et al., International Symposium on GPS/GNSS, Tokyo, Japan, Nov. 25-28, 2008, 904-909) (Year: 2008).*

(Continued)

*Primary Examiner* — Berhanu Tadese
(74) *Attorney, Agent, or Firm* — Suiter Swantz pc llo

(57) ABSTRACT

A receiver system for correlating one or more signals (beam patterns) is disclosed. One or more antenna elements are configured to receive the signals. A controller generates correlator outputs based on a first set of duplicated signals, generates a first set of beams based on the one or more correlator outputs using a first beamforming module, generates a second set of beams based on a second set of duplicated signals using a second beamforming module, generates one or more power estimates based on the second set of beams, and divides each of the first set of beams by a corresponding power estimate to generate one or more normalized correlations.

9 Claims, 2 Drawing Sheets

(56) References Cited

U.S. PATENT DOCUMENTS

| | | | | |
|---|---|---|---|---|
| 6,556,167 B1* | 4/2003 | Disselkoen | G01S 19/30 | 342/357.77 |
| 6,598,009 B2* | 7/2003 | Yang | H01Q 3/30 | 342/423 |
| 6,636,558 B1* | 10/2003 | Schnaufer | H04B 1/7085 | 375/150 |
| 6,687,316 B1* | 2/2004 | McGraw | H04B 1/7085 | 375/E1.016 |
| 6,738,015 B1* | 5/2004 | Linhart | G01S 19/26 | 342/357.31 |
| 6,778,130 B1* | 8/2004 | Bevan | G01S 5/12 | 342/174 |
| 6,779,009 B1* | 8/2004 | Zuber | G06F 17/15 | 708/425 |
| 6,934,327 B1* | 8/2005 | Whited | H04L 27/22 | 375/225 |
| 6,968,021 B1* | 11/2005 | White | H04L 1/005 | 714/799 |
| 6,975,666 B2* | 12/2005 | Affes | H04B 7/086 | 375/130 |
| 7,190,746 B1* | 3/2007 | Stockmaster | G01S 19/37 | 342/383 |
| 7,205,933 B1* | 4/2007 | Snodgrass | G01S 13/003 | 342/148 |
| 7,230,999 B1* | 6/2007 | Deines | G01S 19/24 | 329/304 |
| 7,239,658 B1* | 7/2007 | Zuber | H04L 27/2271 | 375/136 |
| 7,250,903 B1* | 7/2007 | McDowell | H04K 3/228 | 342/357.59 |
| 7,280,464 B1* | 10/2007 | Newhouse | H04L 27/2662 | 370/203 |
| 7,382,846 B1* | 6/2008 | Zange | H04L 27/2017 | 375/364 |
| 7,508,887 B1* | 3/2009 | Chavez | H04L 25/061 | 370/310 |
| 7,609,206 B1* | 10/2009 | Jensen | H01Q 3/26 | 342/372 |
| 7,764,224 B1* | 7/2010 | Anderson | G01S 19/215 | 342/357.27 |
| 7,764,751 B1* | 7/2010 | Hammell | G01S 7/352 | 375/343 |
| 8,160,569 B1* | 4/2012 | VanLaningham | H04W 64/006 | 455/424 |
| 8,301,677 B2* | 10/2012 | Grobert | G01S 19/21 | 708/300 |
| 8,442,020 B1* | 5/2013 | Peterson | G01S 19/30 | 455/139 |
| 8,681,218 B1* | 3/2014 | Jensen | H04N 23/631 | 342/55 |
| 9,019,145 B1* | 4/2015 | Sishtla | G01S 13/953 | 342/26 B |
| 9,513,376 B1* | 12/2016 | Heinrich | G01S 19/47 | |
| 9,702,979 B1* | 7/2017 | Joseph | G01S 19/46 | |
| 9,865,982 B1* | 1/2018 | Cullen | H01S 3/1109 | |
| 10,288,742 B2* | 5/2019 | Dickman | G01S 19/36 | |
| 11,086,023 B1* | 8/2021 | Acheson | G01S 19/30 | |
| 11,255,977 B2* | 2/2022 | Stockmaster | H04B 7/088 | |
| 2003/0039019 A1* | 2/2003 | Large | G02F 1/13473 | 359/252 |
| 2003/0103557 A1* | 6/2003 | Dolwin | H04B 1/7113 | 375/150 |
| 2005/0088337 A1* | 4/2005 | Lorenz | H04B 7/0822 | 342/383 |
| 2008/0130720 A1* | 6/2008 | Dolwin | H04B 1/7115 | 375/150 |
| 2008/0130721 A1* | 6/2008 | Dolwin | H04B 1/7115 | 375/E1.032 |
| 2017/0192100 A1* | 7/2017 | Dickman | G01S 19/21 | |
| 2021/0286091 A1* | 9/2021 | Acheson | G01S 19/31 | |
| 2021/0333412 A1* | 10/2021 | Acheson | G01S 19/30 | |
| 2022/0070834 A1* | 3/2022 | Raghavan | H04B 7/086 | |
| 2023/0069488 A1* | 3/2023 | Chavez | H04B 7/086 | |

FOREIGN PATENT DOCUMENTS

| | | | | |
|---|---|---|---|---|
| CN | 107121677 A | * | 9/2017 | G01S 13/9303 |
| CN | 107315183 A | * | 11/2017 | G01S 19/235 |
| CN | 105302936 B | * | 10/2018 | |
| CN | 109061685 A | * | 12/2018 | G01S 19/21 |
| CN | 107121677 B | * | 10/2019 | G01S 13/9303 |
| CN | 110727915 A | * | 1/2020 | G01S 7/282 |
| CN | 107315183 B | * | 6/2020 | G01S 19/235 |
| EP | 1404033 A2 | * | 3/2004 | G01S 19/21 |
| EP | 2589983 A1 | * | 5/2013 | G01S 19/21 |
| EP | 3748402 A1 | * | 12/2020 | G01S 19/06 |
| GB | 2381714 A | * | 5/2003 | H04B 1/7113 |
| GB | 2397985 A | * | 8/2004 | H04B 1/7113 |
| GB | 2397986 A | * | 8/2004 | H04B 1/7113 |
| GB | 2397987 A | * | 8/2004 | H04B 1/7113 |
| GB | 2397988 A | * | 8/2004 | H04B 1/7113 |
| GB | 2397989 A | * | 8/2004 | H04B 1/7113 |
| JP | 3558053 B2 | * | 8/2004 | H04B 7/0851 |
| JP | 2005507602 | * | 3/2005 | H04B 1/7115 |
| JP | 5801966 B2 | * | 10/2015 | G01S 19/35 |
| KR | 100720569 B1 | | 5/2007 | |
| KR | 100747554 B1 | | 8/2007 | |
| WO | WO-0148944 A1 | * | 7/2001 | H04B 1/71052 |
| WO | WO-0150187 A1 | * | 7/2001 | G02F 1/13363 |
| WO | WO-03039019 A1 | * | 5/2003 | H04B 1/7113 |
| WO | WO-2022046291 A1 | * | 3/2022 | H04B 7/086 |

OTHER PUBLICATIONS

"RAKE receiver", by Tommi Heikkil, Course in Radio Communications, Autumn 2004 (Year: 2004).*

JP2005507602, WIPO Translated (English Language) (Year: 2005).*

Brachvogel, Marius et. al, "A new array concept using spatially distributed subarrays for unambiguous GNSS Interference mitigation in automotive applications" 19 pages ; Navigation. 2020;67:23-41, wileyonlinelibrary.com/journal/navi; Retrieved from the Internet:https://onlinelibrary.wiley.com/doi/epdf/10.1002/navi.353 [retrieved on Jul. 3, 2021].

Konovaltsev, Andriy et al., "Development of Array Receivers with Anti-Jamming and Anti-Spoofing Capabilities with Help of Multi-Antenna GNSS SignalSimulators" 14 pages, Retrieved from the Internet: https://elib.dlr.de/129420/1/84_Konovaltsev_Development_array_receivers_ION_GNSS2019_final.pdf [retrieved on Jul. 3, 2021].

* cited by examiner

TECHNIQUE FOR POST-CORRELATION BEAMFORMING

SUMMARY

A receiver system for correlating one or more signals is disclosed in accordance with one or more illustrative embodiments of the present disclosure. In one illustrative embodiment, the system comprises one or more antenna elements configured to receive the one or more signals. In another illustrative embodiment, the system comprises a controller including one or more processors configured to execute program instructions causing the one or more processors to: duplicate the one or more signals into a first set of duplicated signals and a second set of duplicated signals; generate one or more correlator outputs based on the first set of duplicated signals using one or more correlators, and generate a first set of beams based on the one or more correlator outputs using a first beamforming module; generate a second set of beams based on the second set of duplicated signals using a second beamforming module, and generate one or more power estimates based on the second set of beams using one or more power estimators, wherein each of the first set of beams corresponds to a respective one of the one or more power estimates; and divide each of the first set of beams by the corresponding one of the one power estimates using one or more dividers to generate one or more normalized correlations.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1:
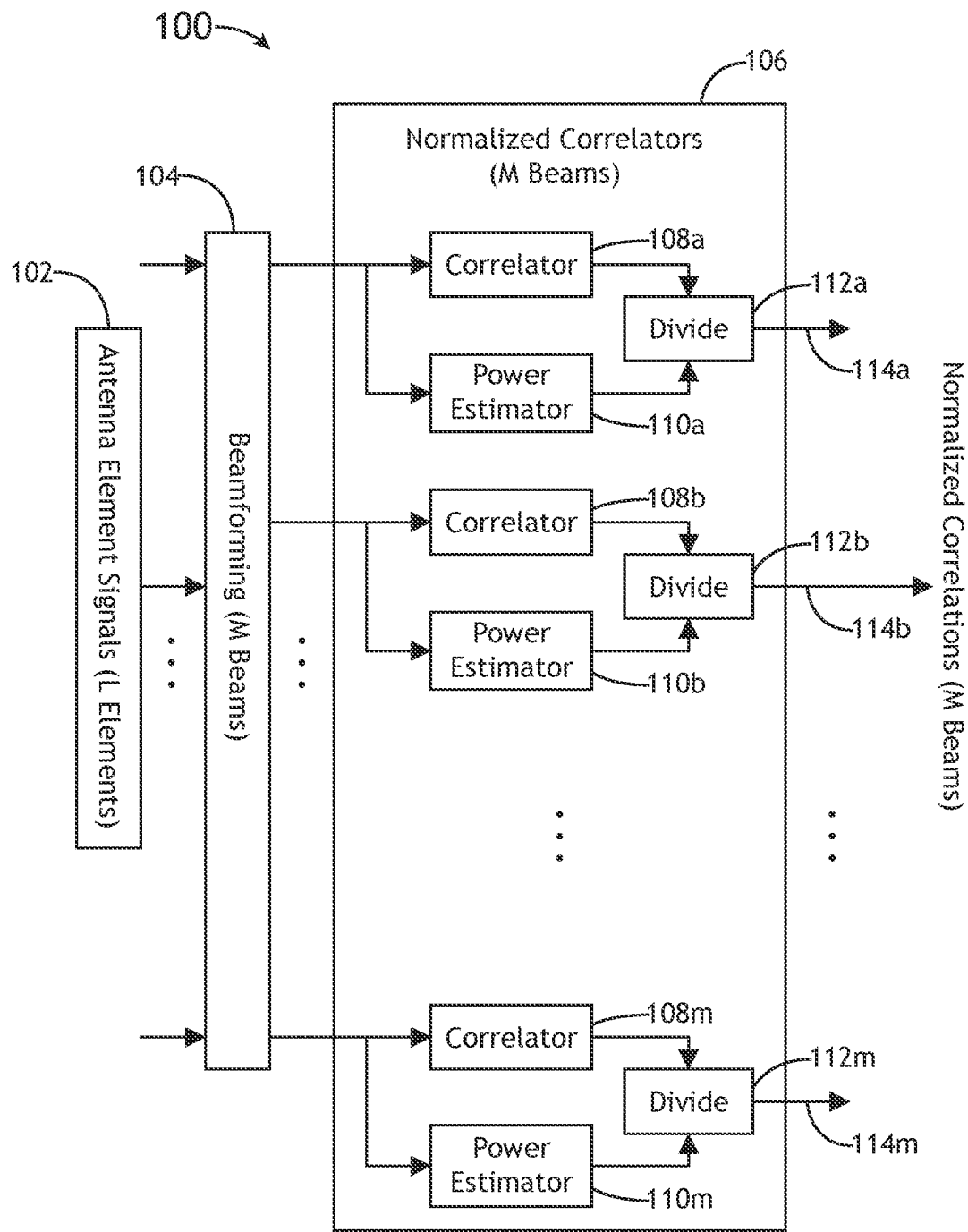
FIG. 1 is a block diagram of a conventional receiver system implementing beamforming prior to correlation.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the present disclosure, numerous specific details are set forth in order to provide a more thorough understanding of the inventive concepts. However, it will be apparent to one of ordinary skill in the art having the benefit of the present disclosure that the inventive concepts disclosed herein may be practiced without these specific details. In other instances, well-known features may not be described in detail to avoid unnecessarily complicating the present disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, use of the "a" or "an" are employed to describe elements and components of embodiments of the present inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the present disclosure.

Highly directional communication systems are desirable in a tactical environment because of the spatial rejection of interference and multipath that can be achieved. Additionally, spatial control of emissions makes it difficult for an adversary to detect, intercept, geolocate, or otherwise exploit the communication signal. Directional communication requires participating terminals (i.e., radio transmitters and/or receivers) to discover the existence and location of other terminals. To maintain the spatial advantages of the directional communication system, the discovery process must be performed with highly directional transmitter and receiver antenna patterns.

To achieve directional discovery in a short period of time, a terminal can attempt to detect other terminals in multiple beam patterns simultaneously. Electronically scanned arrays (ESAs) and digital beamforming enable this type of fast directional discovery. In a conventional approach, a correlation for a known sequence of symbols is performed for each beam pattern at the receiver. If M beam patterns are searched, the conventional approach requires M correlators. Correlators tend to be a dominant part of the signal processing resources required by a communication terminal. Therefore, the conventional approach does not scale well since it requires higher signal processing resources as the number of beams M increases.

Embodiments of the present disclosure are directed to a receiver system employing post-correlation beamforming for correlating received beam patterns. The present receiver system outputs the same correlations as the conventional approach. However, the present receiver system may significantly reduce the signal processing resources consumed when simultaneously correlating over multiple beam patterns, therefore decreasing processing time and enabling fast directional discovery.

FIG. 1 is a block diagram illustrating a conventional receiver system 100 for simultaneously correlating over M beams (more generally, beam patterns). The received signals from L antenna elements 102 (or L antenna subarrays 102) enter a beamforming module 104 to generate M separate beam patterns (i.e., for each radiation pattern corresponding to a unique set of complex weights for the L antenna element signals).

After passing the beamforming module 104, the M beams pass a correlation module 106 including correlators 108a-m. Each beam pattern has a corresponding correlator 108a-m searching for a known sequence (e.g., a sequence of symbols that is known at the transmitter side and at the receiver side). To make reliable detection decisions, the output of each correlator 108a-m is normalized. For example, an estimate of the total power is generated for each correlator output using a corresponding power estimator 110a-m, and each correlator output is then divided by the estimate of the total power using a corresponding divider 112a-m. Thus, a normalized correlation 114a-m is generated for each of M beam patterns. Clearly, the number of correlators 108a-m required (M) for the conventional receiver system 100 is equal to the number of beam patterns simultaneously searched (M), which does not scale well with increasing numbers of received beam patterns.

Figure 2:
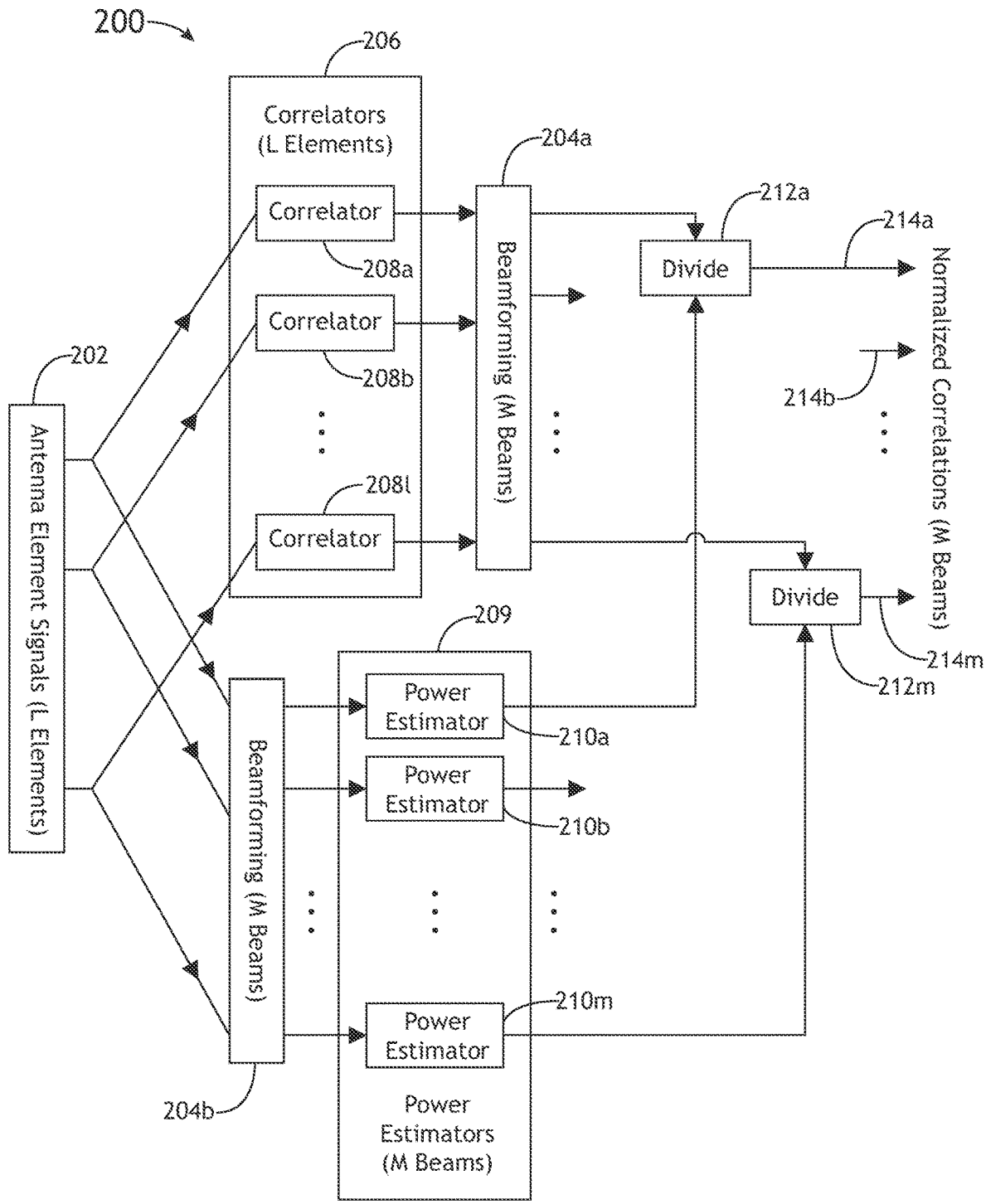
FIG. 2 is a block diagram of a receiver system for implementing post-correlation beamforming, in accordance with one or more embodiments of the present disclosure.

In contrast, FIG. 2 is a block diagram illustrating a receiver system 200 for correlating M beams implementing post-correlation beamforming, in accordance with one or more embodiments of the present disclosure. Each of the signals received from the L antenna elements 202 may be duplicated into a first set of duplicated signals and a second set of duplicated signals. It is noted that the L antenna elements 202 may each comprise separate receiving antenna elements, however, in some embodiments, each of the L antenna elements 202 may instead comprise a subarray of antenna elements.

Each signal of the first set of the duplicated signals from L antenna elements 202 may enter a corresponding correlator 208a-l of a correlation module 206 to search for a known sequence (e.g., a sequence of symbols that may be pseudo-randomly generated, and that may be known at both the transmitter side and at the receiver side). The L outputs of the correlator 208a-l may then then enter the beamforming module 204a. The beamforming module 204a may generate a first set of M beams for M beam patterns. Each beam pattern may be of any shape. For example, each beam pattern may be pointed in a different direction and/or include one or more nulls in various directions. Thus, each beam pattern may have a nominal pointing direction and null pattern that differs from others of the M beam patterns. In general, each beam pattern may have any possible radiation pattern (with any arbitrary shape).

To make reliable detection decisions, each output of the correlators 208a-l may be normalized (e.g., by dividing each correlator output by a corresponding power estimate). Since beamforming and correlation are both linear operations, either can be performed in any order. However, since power estimation is not a linear operation, beamforming must precede the power estimate for each of the M beam patterns. To this end, the second set of duplicated signals received from the L antenna elements 202 may enter the beamforming module 204b. The beamforming module 204b may generate a second set of M beams for the M beam patterns.

Each of the second set of M beams output by the beamforming module 204b may correspond to a respective beam of the first set of M beams output by the beamforming module 204a. The second set of M beams may enter a power estimation module 209, and a power estimate may be generated for each of the second set of M beams using a corresponding power estimator 210a-m.

Finally, the first set of beams output by the beamforming module 204a (derived from the outputs of the correlators 208a-l) may be divided by the corresponding power estimate (derived from the second set of beams output by the beamforming module 204b) using a corresponding divider 212a-m to generate M normalized correlations 214a-m. The normalized correlations 214a-m may then enter a thresholding module configured to compare the normalized correlations 214a-m to a correlation threshold. Each normalized correlation 214a-m above the correlation threshold may be identified as a desirable signal, and each normalized correlation 214a-m below the correlation threshold may be identified an undesirable signal (e.g., noise or an interfering/threatening signal).

The present receiver system 200 obviates the need for a correlator for each of the M beam patterns. Instead, a correlator 208a-l may correspond to each of the L antenna elements. However, the present system 200 may employ a duplicate beamforming module (e.g., beamforming module 204b) prior to the power estimators 210a-m. The present post-correlation beamforming receiver system 200 may be preferable when the number of simultaneously searched beam patterns M is significantly greater than the number of antenna elements L. Under these circumstances, the computational complexity saved by implementing L correlators (instead of M correlators) may outweigh the additional complexity of the duplicate beamforming module. If the number of beam patterns M is ten times the number of antenna elements L, the savings in computation complexity of the present system 200 may be nearly a factor of 10 relative to the conventional approach.

It is noted herein that the generation of normalized correlations 214a-m may be implemented digitally (e.g., by using digital electronics/digital signal processing implemented by a controller). For example, the signals received by the antenna elements 202 may be duplicated to generate the first set of duplicated signals and the second set of duplicated signals digitally (after conversion of received analog signals to digital signals using an analog-digital-converter [ADC]). The correlators 208a-l, beamforming modules 204a-b, power estimators 210a-m, dividers 212a-m, and thresholding module may be implemented as functions and executed by a digital signal processor (DSP). In other embodiments, the generation of normalized correlations 214a-m may be implemented using analog electronics (e.g., before the conversion of the received analog signals to digital signals). Digital beamforming may be implemented for capacity and flexibility (subject to higher power consumption when bandwidth increases), whereas analog beamforming may be implemented for increased coverage (due to low power consumption).

It is noted herein that the controller (e.g., computer or computing device) described above may include one or more processors and a memory. For the purposes of the present disclosure, the term "processor" or "processing element" may be broadly defined to encompass any device having one or more processing or logic elements, for example, one or more DSPs, one or more central processing units (CPUs), one or more graphics processing units (GPUs), one or more micro-processor devices, one or more application specific integrated circuit (ASIC) devices, or one or more field programmable gate arrays (FPGAs). In this sense, the one or more processors may include any device configured to execute algorithms and/or instructions (e.g., program instructions stored in memory), and may be configured to perform the method steps described in the present disclosure. The memory medium may include any storage medium known in the art suitable for storing program instructions executable by the associated one or more processors. For example, the memory medium may include, but is not limited to, a read-only memory (ROM), a random-access memory (RAM), a magnetic or optical memory device (e.g., hard disk), a magnetic tape, a solid-state drive and the like.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A receiver system for correlating one or more signals with post-correlation beamforming comprising:
   one or more antenna elements configured to receive the one or more signals;
   a controller including one or more processors configured to execute program instructions causing the one or more processors to:
      duplicate the one or more signals into a first set of duplicated signals and a second set of duplicated signals;
      generate one or more correlator outputs based on the first set of duplicated signals using one or more correlators before generating a first set of beams;
      generate the first set of beams based on the one or more correlator outputs using a first beamforming module;
      generate a second set of beams based on the second set of duplicated signals using a second beamforming module, and generate one or more power estimates based on the second set of beams using one or more power estimators, wherein each one of the second set of beams generated by the second beamforming module corresponds to a respective beam of the first set of beams output by the first beamforming module,
      wherein each of the first set of beams corresponds to a respective one of the one or more power estimates; and
      divide each of the first set of beams by the respective one of the one or more power estimates using one or more dividers to generate one or more normalized correlations,
      wherein the one or more antenna elements comprises L antenna elements, wherein L is an integer greater than or equal to one, wherein L is less than M, wherein M is a quantity of M beam patterns equal to a quantity of the first set of beams,
      wherein the one or more normalized correlations are configured to enter a thresholding module configured to compare each of the normalized correlations to a correlation threshold.

2. The receiver system of claim 1, wherein the one or more correlators, the first beamforming module, the second beamforming module, the one or more power estimators, and the one or more dividers are implemented using digital electronics.

3. The receiver system of claim 1, wherein the one or more correlators, the first beamforming module, the second beamforming module, the one or more power estimators, and the one or more dividers are implemented using analog electronics.

4. The receiver system of claim 1, wherein each of the one or more antenna elements comprises a sub-array of antenna elements.

5. The receiver system of claim 1, wherein each of the M beam patterns has a nominal pointing direction and null pattern that differs from others of the M beam patterns.

6. The receiver system of claim 1, wherein the normalized correlations above the correlation threshold are identified as desirable signals.

7. The receiver system of claim 1, wherein the normalized correlations below the correlation threshold are identified as undesirable signals.

8. The receiver system of claim 1, wherein generating the one or more correlator outputs comprises matching a known sequence of symbols.

9. The receiver system of claim 8, wherein the known sequence of symbols is pseudo-randomly generated.

* * * * *